(12) United States Patent
Mayer et al.

(10) Patent No.: US 6,450,011 B1
(45) Date of Patent: Sep. 17, 2002

(54) PRESSURE MEASUREMENT METHOD FOR GAS LEAKAGE FROM SEALED PACKAGES

(75) Inventors: Daniel W. Mayer, Wyoming; Robert L. Demorest; Trevor H. Hegg, both of Maple Grove, all of MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 09/721,623

(22) Filed: Nov. 24, 2000

(51) Int. Cl.$^7$ ................................................ G01M 3/02
(52) U.S. Cl. ............................................ 73/49.3; 73/52
(58) Field of Search ............................ 73/40, 49.3, 52

(56) References Cited

U.S. PATENT DOCUMENTS

| | | | | |
|---|---|---|---|---|
| 4,104,905 A | * | 8/1978 | Zachary ........................ | 73/40 |
| 4,145,916 A | * | 3/1979 | Bott et al. ..................... | 73/37 |
| 4,424,708 A | * | 1/1984 | Meuleman .................... | 73/40 |
| 4,593,554 A | * | 6/1986 | Aarts ............................ | 73/45.4 |
| 4,951,496 A | * | 8/1990 | Aarts ............................ | 73/49.3 |
| 5,042,291 A | * | 8/1991 | Lehmann ...................... | 73/49.3 |
| 5,150,605 A | * | 9/1992 | Simpson ....................... | 73/49.3 |
| 5,404,747 A | * | 4/1995 | Johnston et al. .............. | 73/40 |
| 5,513,516 A | * | 5/1996 | Stauffer ........................ | 73/49.2 |
| 5,831,147 A | * | 11/1998 | Hoath ........................... | 73/40.7 |
| 5,915,270 A | * | 6/1999 | Lehmann ...................... | 73/49.3 |
| 5,939,619 A | | 8/1999 | Achter et al. | |
| 6,050,133 A | | 4/2000 | Achter et al. | |

* cited by examiner

Primary Examiner—Hezron Williams
Assistant Examiner—Michael Cygan
(74) Attorney, Agent, or Firm—Paul L. Sjoquist

(57) ABSTRACT

A non-destructive method for testing sealed packages for leakage, particularly packages having a gas-permeable portion and a non-gas-permeable portion, by applying a temporary barrier over the gas-permeable portion, wherein the temporary barrier has an aperture, and connecting the aperture to a pressure monitor, and recording the pressure drop in the sealed package, via the aperture, for a predetermined time.

9 Claims, 1 Drawing Sheet

PRESSURE MEASUREMENT METHOD FOR GAS LEAKAGE FROM SEALED PACKAGES

BACKGROUND OF THE INVENTION

The present invention relates to a method for measuring the amount of gas that leaks through sealed packages. More specifically, the invention relates to gas leakage through packages that have been sealed by a cover of porous material fabricated as a mat of polyethylene fibers. This material acts as a permeable membrane to gases, but an impermeable membrane to bacteria. The membrane comprises a layer having pores which provide a tortuous path to the passage of bacteria; the material is commonly sold under the trademark designation "TYVEC." The packages which use this material are typically semi-rigid plastic cases which protect medical devices and appliances after manufacture and before actual use.

The invention relates to U.S. Pat. No. 5,939,619, issued Aug. 17, 1999, entitled "Method and Apparatus for Detecting Leaks in Packaging," and U.S. Pat. No. 6,050,133, issued Apr. 18, 2000, entitled "Method and Apparatus for Detecting Leaks in Packaging." Both of these patents are owned by the assignee of the present invention. The present invention also relates to co-pending application entitled "Method for Measuring Gas Leakage From Sealed Packages," Ser. No. 09/676,621, filed Oct. 2, 2000, and owned by the assignee of the present invention. The present invention permits a measurement of leakage that is wholly non-destructive to the package.

Gas sterilization is widely used for medical devices that must be sterile at the time of use, but cannot be subjected to sterilization by the application of high temperatures. Examples of such medical devices include cardiac pacemakers and catheter-based monitoring devices such as blood pressure probes. Typically, the medical device is sealed within a package that is permeable to gases but impermeable to bacteria. The package is then placed in a gas sterilization chamber, and a sterilizing gas such as ethylene oxide is introduced into the gas-permeable package to achieve sterilization. The sterilizing gas is then removed from the package, leaving the interior of the package sterile and non-toxic.

In a typical design, the medical device is placed within a thermoformed rigid plastic tray equipped with a flat sealing flange. A sheet of gas-permeable membrane, such as DuPont TYVEK® 1073-B (medical grade) brand membrane, which is available from E. I. duPont de Nemours & Co., is then sealed to the sealing flange, typically by using an adhesive. The integrity of the seal is critically important to maintaining sterility. Leaks can result from incorrect setting of parameters in the automated sealing process, or from physical defects such as burrs on the face of the sealing equipment.

According to the known practice described in the prior art patents listed herein, a temporary barrier is formed over the gas-permeable layer, wherein the temporary barrier has an aperture with the gas-permeable layer to temporarily seal the gas-permeable layer except where the aperture is located. A tracer gas is applied under low pressure through the aperture so that it can enter into the interior chamber of the package. The entire package is placed into a larger sealed second chamber, and the concentration of tracer gas in the second chamber is measured, outside the package, to thereby measure the amount of tracer gas which has leaked through the package, presumably via leaks in the sealing flange, although leakage can also occur through pinhole defects in the plastic tray itself.

The methods described in the foregoing patents provide very accurate measurements and evaluations for sealed packages, under controlled conditions. However, in many applications, it is not necessary to achieve a high degree of accuracy in the leakage measurement, but is desirable to provide a quick evaluation of leakage as a production line test, to determine whether packages are leaking excessively. Excessive leakage is defined in terms of leakage beyond a predetermined range of acceptability, as a pass/fail parameter, and the precise degree of leakage does not need to by quantified. Methods for making this type of determination should produce results more quickly and at a lesser cost.

The present invention provides a pass/fail test which can be quickly performed at considerably less cost in terms of test equipment and testing time, because it relies on measurement of internal package gas pressure, and specifically pressure drop, caused by leakage of gas from within the package. The method of the present invention can be performed in a short time, perhaps 30–60 seconds, using very much less expensive equipment than prior art methods.

SUMMARY OF THE INVENTION

The present invention comprises a method for testing sealed packages of the type described herein for leakage, according to a more efficient and faster process than is known in the prior art. The method requires a barrier layer to be overlaid on the gas-permeable membrane of the package, the barrier layer having a single aperture to the gas-permeable membrane. A pressure-sensitive monitor is affixed over the aperture, to monitor the pressure inside the package, and more particularly, to monitor the relative drop in pressure caused by leakage from the package. The internal package gas pressure is initially incrementally increased as a step of the method, and the incremental drop in pressure is measured as a function of time, usually by determining whether pressure drops incrementally between two desired set points within a predetermined time increment.

It is a principal object and advantage of the present invention to provide a method for measuring leakage through packages under faster test conditions than have heretofore been known.

It is another object and advantage of the present invention to provide a leakage test method which does not destroy the package being tested.

Other and further objects and advantages of the invention will become apparent from the following specification and claims and with reference to the appended drawings.

DESCRIPTION OF THE PREFERRED EMBODIMENT

Figure 1:
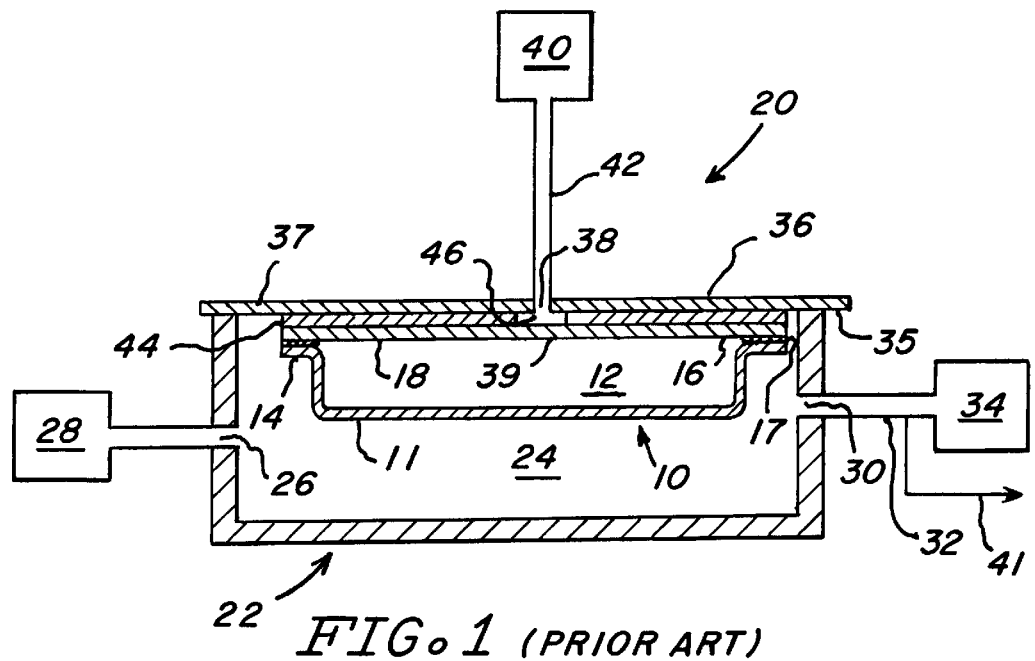
FIG. 1 shows a cross section view of an apparatus for practicing the method of the prior art.

Referring to the drawing figures, it should be understood that the test apparatus shown in each figure does not form a part of the present invention, and that the drawings are not-necessarily to scale. Reference to the drawings enables a better understanding of the methods of the prior art and of the present invention, and particularly to show the principles of the present invention and its advantages over the prior art method. In the figures, like reference characters refer to the same or functionally similar parts of the respective devices illustrated in each of the figures.

Referring first to FIG. 1, a prior art apparatus is shown which is useful for practicing the leakage testing method of the prior art, as described in U.S. Pat. No. 6,050,133. A leak detection apparatus 20 has confined therein a sealed package 10 which is positioned for leakage testing. The sealed package 10 includes a tray 11, a sealing flange 14 with an adhesive sealant 16 applied thereto and a gas-permeable sheet or membrane 18 affixed to the sealing flange 14 by the sealant 16, all enclosing an interior chamber 12. The sealant 16 has an external edge 17 which forms a sealing bead around the perimeter of the flange 14 and the perimeter of the gas-permeable sheet or membrane 18. As described hereinbefore, the gas-permeable membrane is a porous membrane formed of a thermoplastic or paper that allows passage through the membrane of a gas but not larger particles, such as dust, bacteria, etc. In one embodiment of a sealed package that the present method is usefully applied to, the gas-permeable membrane 18 is a mat of polyolefin fibers available from duPont under the trademark TYVEK. Typically, the gas-permeable membrane 18 has a thickness in the range of between about 0.127 and 0.254 millimeters.

The leak detection apparatus 20 has a housing 22 which encloses a chamber 24, of sufficient size for holding the package. The housing 22 is made from metal or other non-gas-permeable material. The housing 22 has an inlet 26 which is connected to a source 28 of carrier gas and/or a source of purge gas. A suitable purge gas can be air, nitrogen, or any other gas which can purge tracer gas quantities from chamber 24, and a suitable carrier gas can be any gas, such as air or nitrogen, which is suitable for carrying tracer gas to a detector without affecting the tracer gas measurement capabilities of the detector. The housing 22 also has an outlet 30 which is connected to a suitable detector 34, via a conduit 32. The detector 34 may be a coulox detector or any other type of detector for the tracer gas being used, and may include a mass spectrometer or infrared gas detector. The conduit 32 has a vent exit 41 for selectively removing purge gas from the testing apparatus. The housing 22 has a removable cover 36 which provides a seal 35 to enclose chamber 24. The cover 36 has an aperture 38 which is connectable via conduit 42 to a source 40 of tracer gas.

Prior to inserting the package 10 into chamber 24, a temporary barrier layer 44 is applied between the cover 36 and the membrane 18, either by adhering the temporary barrier layer 44 to the underside of cover 36 or to the top surface of membrane 18. In either event, the layer 44 has an aperture 46 which is aligned with aperture 38 of cover 36, for delivery of tracer gas to the exposed portion 39 of the gas-permeable membrane 18, and all of the remaining surface area of membrane 18 is covered by layer 44.

One preferred material for barrier layer 44 is a gas-impermeable tape with a thin coating of adhesive, to bond to the gas-permeable membrane 18 to seal without voids or gaps. When the tape is removed after testing, the adhesive remains with the tape, leaving little or no residue on the surface of the gas-permeable sheet 18.

According to the method of the prior art, the package 10 is placed into chamber 24 of the testing apparatus 20, and the chamber 24 is then purged of all residue gases. The purge gas is then stopped and the tracer gas is applied into conduit 42 at a pressure of up to about a maximum of 1.0 psig, until the pressure in package chamber 12 is equalized with the tracer gas pressure. The package 10 is maintained within the testing apparatus chamber 24 for a predetermined length of time to allow the concentration of tracer gas to build up within the chamber 24 if any leaks are present in the package 10. The concentration of tracer gas is then conveyed from chamber 24 to a detector 34 where it is measured, preferably by a trace gas analyzer using a mass spectrometer or other suitable instrument. In a preferred embodiment, the mass spectrometer is a quadrupole residual gas analyzer tuned for helium, as the tracer gas. The analyzer is usually linked to a microcomputer (not shown) with a human interface such as a display panel, data storage, and programs to compare test data with control samples. However, tracer gases other than helium can be used; for example, if carbon dioxide is used as a tracer gas an infrared analyzer can be a suitable alternative to the mass spectrometer.

Figure 2:
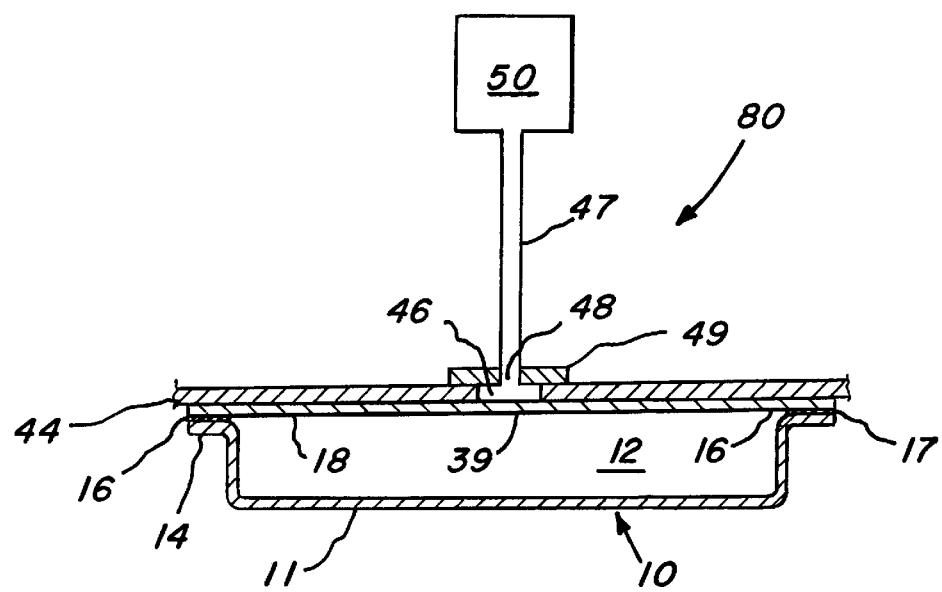
FIG. 2 shows a cross-section view of an apparatus for practicing the method of the invention.

Referring to FIG. 2, a testing apparatus 80 is shown which permits the practice of the method of the present invention. The leak detection apparatus 80 comprises a sealed package 10 which is positioned for leakage testing. The sealed package 10 includes a tray 11, a sealing flange 14 with an adhesive sealant 16 applied thereto and a gas-permeable, sheet or membrane 18 affixed to the sealing flange 14 by the sealant 16, all enclosing an interior chamber 12. The sealant 16 has an external edge 17 which forms a sealing bead around the perimeter of the flange 14 and the perimeter of the gas-permeable sheet or membrane 18. As described hereinbefore, the gas-permeable membrane is a porous membrane formed of a thermoplastic or paper that allows passage through the membrane of a gas but not larger particles, such as dust, bacteria, etc. In one embodiment of a sealed package that the present method is usefully applied to, the gas-permeable membrane 18 is a mat of polyolefin fibers available from duPont under the trademark TYVEK. Typically, the gas-permeable membrane 18 has a thickness in the range of between about 0.127 and 0.254 millimeters.

A temporary barrier layer 44 is applied over the membrane 18, by adhering the temporary barrier layer 44 to the top surface of membrane 18. The layer 44 has an aperture 46 which is aligned with an aperture 48 inside a conduit 47. All of the remaining surface area of membrane 18 is covered.by layer 44. A seal 49 is formed about the conduit 47 to provide a complete seal of the conduit against the top surface of barrier layer 44.

One preferred material for barrier layer 44 is a gas-impermeable tape with a thin coating of adhesive, to bond to the gas-permeable membrane 18 to seal without voids or gaps. When the tape is removed after testing, the adhesive remains with the tape, leaving little or no residue on the surface of the gas-permeable sheet 18.

The conduit 47 is connected to a pressure sensor 50 which is capable of detecting very small pressure variations. In addition thereto the pressure sensor 50 may also include a pressurizing device which can apply a very small, incremental, positive pressure to the interior chamber 12 via the aperture 46 and the exposed portion 39 of the membrane 18.

The steps of the method include placing the temporary barrier layer 44 over the membrane 18 as shown. A slight positive pressure of up to about 1.0 psig. is applied to the interior 12 of the package 10 via the pressure sensor device 50. Finally, the conduit 47, connected to the pressure sensor 50 transmits the interior pressure variations to the sensor 50, and the sensor 50 is monitored to detect any pressure drops-which might occur. The observed pressure drop is compared against known measurements previously made to sealed packages, and a measurement of relative leakage is therefore possible. The process provides a very low pressure stress internal to the package, while permitting a measurement of leakage. A major advantage of the method over the prior art is that it provides a leakage measurement at very low cost, and at a very rapid measurement time.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A non-destructive method for testing for leakage in a sealed package having an interior chamber formed of a gas-permeable portion and a non-gas-permeable portion, comprising the steps of:
   a) placing said package in an environment under atmospheric pressure;
   b) forming a temporary barrier having an aperture to the gas-permeable portion to temporarily seal the gas-permeable portion except at said aperture;
   c) connecting said temporary barrier aperture via a conduit to a pressure monitor; and
   d) monitoring the rate of pressure decay by the pressure monitor, to thereby obtain a relative leakage measurement from the package.

2. The method of claim 1, further comprising the step, after step (c), of applying a positive pressure to the interior of the package via the conduit connection to said pressure monitor.

3. The method of claim 1, wherein the temporary barrier includes a sheet having a removable adhesive on at least one side.

4. The method of claim 1, wherein the gas-permeable portion of said package is formed with a material selected from the group consisting of paper and a polyolefin mat.

5. The method of claim 1, wherein the non-gas-permeable portion of said package is formed from a polymer selected from the group consisting of polyethylene, polypropylene, polyvinyl chloride and polyethylene terepthalate.

6. A method for testing for leakage in a sealed package having an interior chamber formed of a gas-permeable portion and a non-gas-permeable portion, comprising the steps of:
   a) placing the package under atmospheric pressure;
   b) forming a temporary barrier having an aperture to the gas-permeable portion to temporarily seal the gas-permeable portion except at said aperture;
   c) applying an initial slight positive pressure to said interior chamber through said aperture;
   d) monitoring the pressure in said internal chamber, via said aperture;
   e) selecting a predetermined first set point pressure, lower than said initial slight positive pressure, for comparison to said internally monitored pressure;
   f) measuring the time required for said internally monitored pressure to decrease to said first set point pressure; and
   g) signaling an alarm if said monitored time is less than a predetermined value.

7. The method of claim 6, further comprising the step, after step d), of selecting a predetermined second set point pressure, lower than said first set point pressure; and the step of measuring the time further comprises measuring the time required for said internally monitored pressure to decrease from said first set point pressure to said second set point pressure.

8. The method of claim 7, wherein said monitored time interval is less than one minute.

9. The method of claim 8, wherein said first set point pressure and said second set point pressure are each less than 1.0 psig.

* * * * *